United States Patent [19]
Tohill et al.

[11] Patent Number: 5,593,085
[45] Date of Patent: Jan. 14, 1997

[54] METHOD OF MANUFACTURING AN IMPELLER ASSEMBLY

[75] Inventors: Henry J. Tohill, Chula Vista, Calif.; Russell B. Gallagher, Painesville, Ohio; Kenneth G. Kubarych, Delmar; Nils O. Hallstrom, San Diego, both of Calif.

[73] Assignee: Solar Turbines Incorporated, San Diego, Calif.

[21] Appl. No.: 408,434

[22] Filed: Mar. 22, 1995

[51] Int. Cl.$^6$ .............................. B23K 20/00; B23P 15/04
[52] U.S. Cl. .......................... 228/193; 228/103; 228/186; 29/889.21
[58] Field of Search .................... 228/103, 193, 228/205, 175, 186; 416/213 R; 29/889.21, 889.5

[56] References Cited

U.S. PATENT DOCUMENTS

| | | | |
|---|---|---|---|
| 3,107,627 | 10/1963 | Clarke et al. | 103/115 |
| 3,905,723 | 9/1975 | Torti, Jr. | 416/241 |
| 3,919,757 | 11/1975 | McGuire | 29/420 |
| 3,940,268 | 2/1976 | Catlin | 75/208 |
| 4,021,910 | 5/1977 | Freeman et al. | 29/526 |
| 4,065,846 | 1/1978 | Leonard, Jr. | 228/119 |
| 4,096,615 | 6/1978 | Cross | 29/156 |
| 4,097,276 | 6/1978 | Six | 75/208 |
| 4,125,417 | 11/1978 | Antony | 148/131 |
| 4,131,226 | 12/1978 | Breiter et al. | 228/198 |
| 4,152,816 | 5/1979 | Ewing et al. | 29/156 |
| 4,383,809 | 5/1983 | Hoffmuller | 425/78 |
| 4,428,717 | 1/1984 | Catterfeld | 416/186 |
| 4,494,287 | 1/1985 | Cruzen et al. | 29/156 |
| 4,573,876 | 3/1986 | Egan et al. | 416/213 |
| 4,581,300 | 4/1986 | Hoppin, III et al. | 428/546 |
| 4,604,780 | 8/1986 | Metcalfe | 29/156 |
| 4,659,288 | 4/1987 | Clark et al. | 416/186 |
| 4,680,160 | 7/1987 | Helmink | 419/6 |
| 4,720,243 | 1/1988 | Katayama et al. | 416/188 |
| 4,796,343 | 1/1989 | Wing | 29/889.21 |
| 5,061,154 | 10/1991 | Kington | 416/186 |
| 5,106,012 | 4/1992 | Hyzak et al. | 228/265 |
| 5,113,583 | 5/1992 | Jenkel et al. | 29/889 |
| 5,284,288 | 2/1994 | Woodward | 228/193 |
| 5,297,723 | 3/1994 | Benn et al. | 228/193 |
| 5,416,253 | 5/1995 | Weltman et al. | 588/259 |

*Primary Examiner*—Samuel M. Heinrich
*Attorney, Agent, or Firm*—Kenneth A. Rhoads

[57] ABSTRACT

A method for determining the generation of a diffusion bond between two articles is disclosed. The two articles are sealed together to define a cavity therebetween. A vacuum is drawn in the cavity by means of an evacuation tube having a passageway. The passageway is then sealed and the articles are subjected to a temperature and pressure to diffusion bond the articles together. A successful diffusion bond can be determined if the evacuation tube sidewall is collapsed.

13 Claims, 6 Drawing Sheets

METHOD OF MANUFACTURING AN IMPELLER ASSEMBLY

TECHNICAL FIELD

This invention relates to a method of manufacturing an impeller wheel assembly made from a separate hub and wheel. More specifically this invention relates to the pre-testing of the vacuum integrity of a sealed cavity defined between mating surfaces of the articles and visually determining the successful diffusion bonding of the articles.

BACKGROUND ART

Articles such as impeller wheels used in compressors, pumps, gas turbine engines and the like are conventionally manufactured from a monolithic or single piece casting that often requires the pouring of over 45 kilograms (100 pounds) of molten air melt alloy into a ceramic mold to yield a casting typically half the pouring weight. The relative massive hub of such a one piece casting provides a concentrated molten heat source that slows the solidification rate of the casting, often resulting in severe burn-in by the molten metal into the mold face coat due to the presence of oxygen, causing poor surface finish in the flow path of the casting. This is of great concern when the flowpath is configured as a shrouded impeller, where the shroud greatly limits access to the flowpath to blend smooth the affected surface. In addition, when cast as one-piece, the massive central hub acts as a heat source during cooling of the impeller wheel casting, slowing down the solidification rate of the adjacent thinner outer vane impeller shroud. Undesirable, this causes the vanes to have relatively poor dimensional repeatability due to uncontrolled variations in the solidification pattern. This results in a wide variation in air flow characteristics of the impeller wheel which is detrimental to the performance of the compressor, pump, or gas turbine engine.

An impeller wheel assembly comprising a hub and a vane ring having adjacent mating surfaces metallurgically bonded together by hot isostatic pressing overcomes many of the manufacturing problems associated with a one-piece cast impeller wheel. Hot isostatic pressing, or HIP bonding as it is well known in the art, is a process in which all the exposed surfaces of the impeller wheel assembly would be subjected to the direct application of elevated temperature and pressure to press the mating surfaces of the vane ring and hub together to form a diffusion bond therebetween so as to establish a highly efficient metallurgical joint. Typically, the pressure is applied through an inert argon gas in a pressure vessel, e.g., an autoclave.

As is known in the art, in order to obtain a metallurgically sound diffusion bond it is necessary to have the outer perimeter of the mating surfaces to be bonded sealed during hot isostatic pressing in a HIP autoclave, so that only the exposed exterior surfaces of the hub and vane ring will be subject to the autoclave pressure and temperature to effect the desired bond. U.S. Pat. NO. 4,096,615 which issued on Jun. 27, 1978 to Cross and U.S. Pat. No. 4,152,816 which issued on May 8, 1979 to Ewing each recognize the problem of sealing the interface cavity or gap between the hub and the impeller casting prior to HIP bonding. Both Cross and Ewing use a brazing alloy to seal the gap. Ewing also shows a passive method of helium leak testing prior to HIP bonding.

In U.S. Pat. No. 4,581,300 which issued on Apr. 8, 1986 to George S. Hoppin III et al, the interface surfaces between the hub and the blade ring are positively sealed by a deformable plate that is electron-beam welded and subsequently brazed to the blade ring to seal the dissimilar metal hub inside a blade ring cavity. After HIP bonding, the plate is removed by machining, and the wheel finish machined.

One of the major difficulties associated with HIP bonding of cast shapes is the occurrence of through-wall or through-seal discontinuities which allow HIP pressure to leak into the interface cavity intended to be bonded, thereby equalizing the internal and external pressure so as to defeat the HIP bonding process.

The problem is more evident in large ferrous-based castings, which often have through wall discontinuities such as micropores that are not detectable by conventional fluorescent penetrant and radiographic methods. Weld and braze sealing of the joint between the hub and vane ring have similar problems. Even through-wall porosity may not have been detected prior to HIP bonding, the external pressures and temperatures of the HIP cycle sometimes cause membranes of a porosity chain to rupture, thereby allowing external pressure to reach the interface cavity so as to defeat the bonding process.

Typically, after the HIP cycle has been completed, its failure or success is usually determined by machining through the welded or brazed seals to expose the bond interface. If any evidence of the interface between the hub and vane ring can be found, as by conventional non-destructive test methods such as fluorescent penetrant inspection, the bond is considered a failure. The source of such failure is usually only a matter of speculation, and the HIP procedures, including separating the hub and vane ring, re-cleaning, re-assembly and re-sealing, is repeated with what is now a low likelihood of success. Often the vane ring is distorted or otherwise damaged during removal of the hub, resulting in considerable expense of labor, time, equipment, waste of natural 10 resources, and a loss of a major expensive component of the impeller wheel assembly.

Heretofore, the inability to readily verify the vacuum integrity of the pre-HIP impeller wheel assembly, and the inability to readily verify a successful bonding cycle, have prevented HIP bonding of two piece impeller assemblies from achieving the status of a viable production process.

The present invention is directed to overcome one or more of the problems as set forth above.

DISCLOSURE OF THE INVENTION

In one aspect of the invention, a method is provided for determining the generation of a diffusion bond between two articles defining a cavity therebetween. An evacuation tube is provided having a sidewall and a passageway therethrough. The evacuation tube and the periphery of the mating articles are sealed together defining the cavity between the articles with the evacuation passageway in communication with the article cavity. A vacuum is drawn in the article cavity and the article cavity is tested for leaks. The evacuation tube passageway is then sealed. The sealed articles are then subjected to a temperature and pressure sufficient to diffusion bond the articles together. The evacuation tube is inspected with a successful diffusion bonding of the articles determined in response to the evacuation tube sidewall being collapsed. An unsuccessful diffusion bonding of the articles is determined in response to the evacuation tube sidewall not being collapsed.

In another aspect of the invention, a method is provided for determining the generation of a diffusion bond between adjacent mating surfaces of an impeller wheel assembly including a vane ring and a hub. The vane ring is pre-formed from ferrous material and has a first surface. The hub is preformed from ferrous material and has a second surface. The first surface and the second surface are of substantially mating shape. The hub is placed in the vane ring such that the first surface of the vane ring is adjacent to the second surface of the hub and defining co-terminus peripheries therebetween. The periphery of the vane ring and the hub are joined by welding and define a sealed cavity therebetween. An evacuation tube having a side wall and a passageway therethrough is connected to the cavity. A vacuum is drawn in the cavities through the passageway of the evacuation tube. The passageway of the evacuation tube is sealed while under vacuum to seal the cavity under vacuum. The vane ring, hub and evacuation tube are then subjected to a temperature and pressure sufficient to diffusion bond the adjacent first and second surfaces. By inspecting the evacuation tube a successful diffusion bond of the surfaces can be determined if the evacuation tube sidewall are collapsed. An unsuccessful diffusion bonding of the surfaces can be determined if the evacuation tube sidewalls are not collapsed.

BEST MODE FOR CARRYING OUT THE INVENTION

Figure 1:
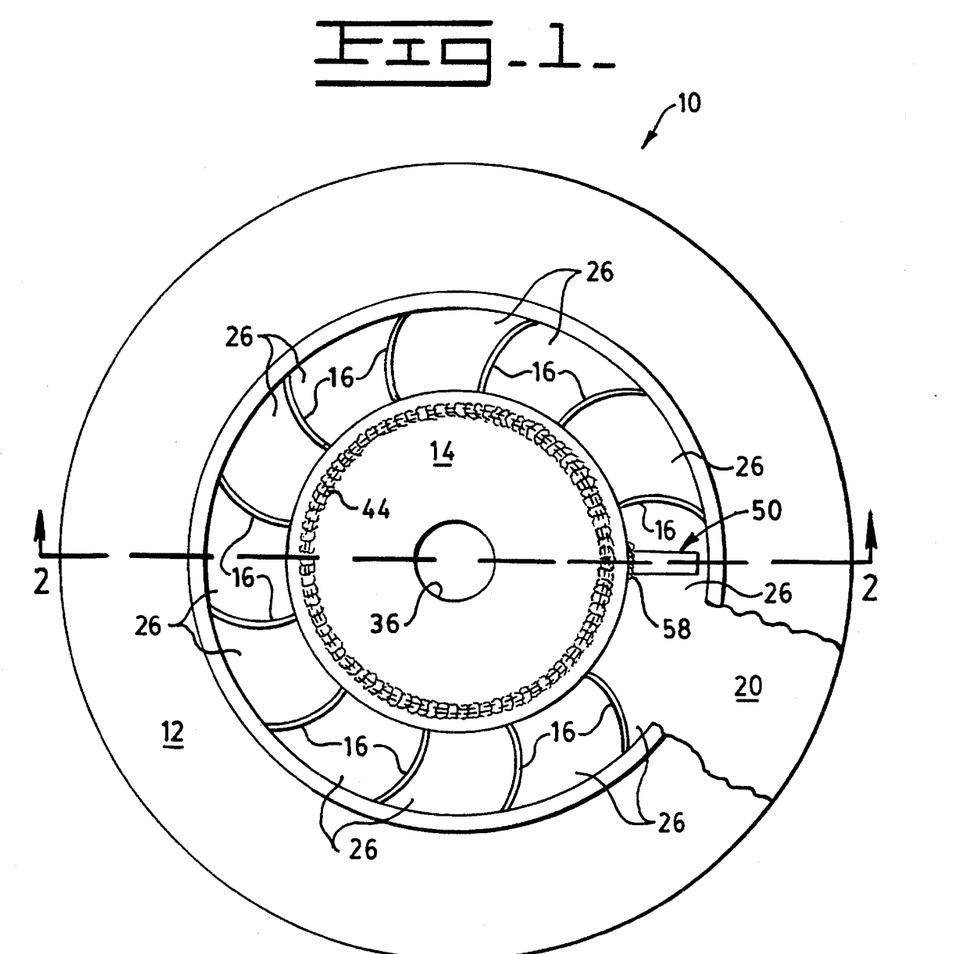
FIG. 1 is a diagrammatic top view of an impeller wheel assembly of this invention.
Figure 2:
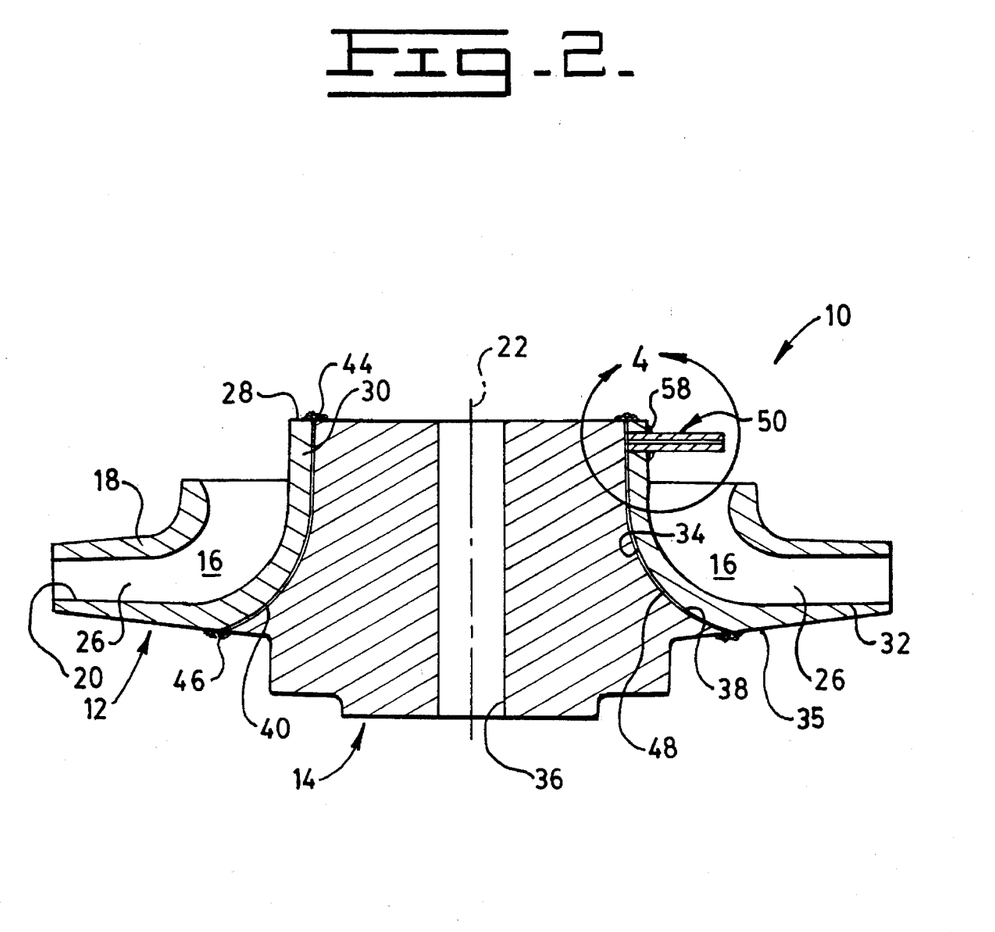
FIG. 2 is a diagrammatic cross-sectional view of the impeller wheel assembly of this invention taken along line 2—2 of FIG. 1.

Referring to FIGS. 1 and 2 an impeller wheel assembly 10 is disclosed for a gas compressor or the like. In the preferred embodiment, the impeller wheel assembly 10 includes a first article or shrouded ferrous vane ring 12 and a second article or ferrous hub 14. The vane ring 12 and hub 14 are typically pre-formed castings. The vane ring 12 and the hub 14 are adapted to be diffusion bonded to one another by hot isostatic pressing (HIP), as is well known in the art to form a monolithic impeller wheel assembly 10.

The vane ring 12 defines a central opening 15 and has a plurality of spaced apart curvilinear vanes 16, a first ring wall 18, a second ring wall 20, and a central axis 22. The plurality of vanes 16 are connected to the first and second walls 18, 20 at spaced apart locations. The first wall 18, the vanes 16 and second wall 20 define a plurality of flow passages 26.

The second wall 20 has an end surface 28, and inner and outer end portions 30, 32. The outer end portion 32 is of general planar configuration. The inner end portion 30 has a first inner peripheral machined surface 34 of a general curvilinear configuration and a joining outer surface 35 of generally planer configuration.

The hub 14 defines a central opening 36 and a second outer peripheral machined surface 38 of general curvilinear configuration in axial alignment with the first inner peripheral surface 34 of the vane ring 12. The first inner surface 34 and the second outer surface 38 are of substantially mating shape and positionable in closely spaced juxtaposition with one another when the hub 14 is placed in the vane ring 12 and define co-terminus peripheries therebetween.

In the assembled position as shown in FIG. 1, a small annular clearance gap 40 of preselected width is defined between the adjacent mating surfaces 34 and 38. The annular gap 40 is sealed on both end portions by first and second circumferential welds 44 and 46 joining the vane ring 12 and the hub 14 and defining an annular article cavity 48. The width of the annular gap 40, shown in FIG. 2, has been greatly exaggerated for clarity.

As best shown in FIGS. 2, 4, 5, and 6 an evacuation tube 50 having a sidewall 52 and an evacuation passageway 54 is fitted in a hole 56 defined in the vane ring 12 with the evacuation passageway in fluid communication with the article cavity 48. Preferably the hole 56 is located in the inner end portion 30 of the second wall 20 adjacent end surface 28. The axis of the hole 56 in this embodiment being generally perpendicular to the central axis 22. The evacuation tube 52 is axially sealed in the hole 54 by a third circumferential weld 58.

In the preferred embodiment of the invention, the material chosen for the vane ring 12 casting was 15-5 PH, a ferrous-base material which can be precipitation hardened to a wide range of mechanical properties. 400 series alloys, such as 410 are also commonly used for large impeller wheel assemblies. The hub 14 may be cast or wrought, and preferably of the same alloy as the vane ring 12 casting to achieve uniform mechanical properties after heat treatment. The arrangement however, allows for the use of different materials for the vane ring 12 and the hub 14.

Figure 3:
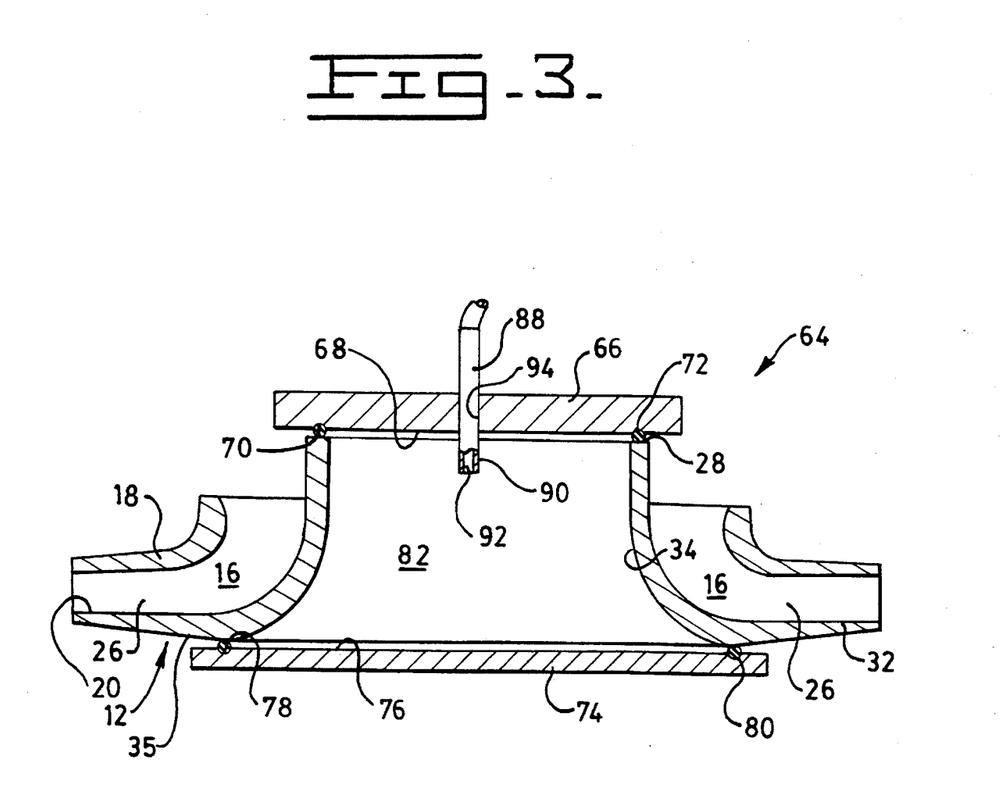
FIG. 3 is a diagrammatic cross-sectional view of a pre-assembly leak testing apparatus for a vane ring of the impeller wheel assembly.

A pre-assembly leak check is performed on the vane ring 12 to detect any through-wall pores which could defeat the HIP bonding procedure. FIG. 3 illustrates an apparatus 64 for performing the leak check. The apparatus 64 includes a first sealing plate 66 having a first sealing plate surface 68 on one side thereof with a first annular groove 70 defined therein. A first elastomeric member 72 is disposed in the first annular groove 70 and in sealing engagement with the end surface 28 of the vane ring 12. The apparatus 64 further includes a second sealing plate 74 having a second sealing plate surface 76 on one side thereof with a second annular groove 78 defined therein. A second elastomeric member 80 is disposed in the second groove 78 and in sealing engagement with the outer surface 35 of the vane ring 12.

The first and second sealing plates 64, 74 close the ends of the central opening 15, thereby creating a vane ring chamber 82 defined by the first and second sealing plate surfaces 68 and 76 and the inner peripheral machined surface 34 of the vane ring 12. An apparatus evacuation tube 88 having an apparatus evacuation tube sidewall 90 defining an apparatus evacuation tube passage 92 is sealably secured in an aperture 94 defined in the first sealing plate 64. The apparatus evacuation passage 92 is in fluid communication with the chamber 82. A helium leak detector such as a Varian Model 938-11, which includes a 11 CFM mechanical vacuum pump (not shown) is connected to the apparatus evacuation tube 92 and a high vacuum is generated in the chamber. Helium is methodically applied to the flow passages 26 to detect any through-wall pores in second wall 20 which if present would activate an audible alarm signal. If leakage locations are identified the locations shall be inert gas arc welded to repair the defect while the chamber 82 is still under vacuum. The inward force generated by the vacuum draws the molten metal into the defect thus avoiding additional defects typically formed while welding shrinkage type discontinuities.

In the practice of the invention, the interface surfaces 34, 38 should be cleaned prior to being assembled and weld sealed. Cleaning should be preformed in a well ventilated, clean-room type environment using a residue-free solvent such as methanol (methyl alcohol) or MEK. The mating surfaces 34, 38 are repeatedly wiped using a solvent soaked certified lint free cloth such a TEXWIPE TX309 a product of Texwipe Co., Upper Saddle River, N.J. 07458 until no discoloration of the cloth can be seen under 200 ft. candles of white light. Assembly must be performed immediately after cleaning.

Figure 4:
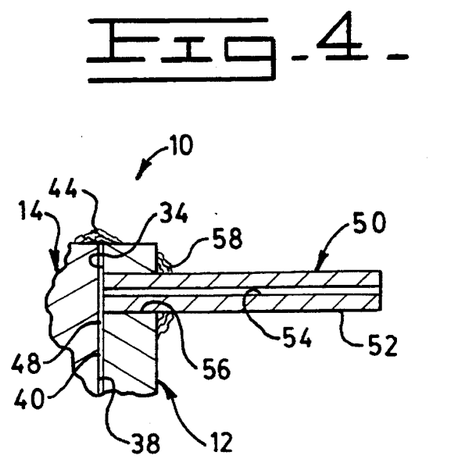
FIG. 4 is an enlarged fragmentary diagrammatic cross-sectional view of FIG. 3 showing a hole defined in the vane ring and an evacuation tube welded in the hole communicating with the interface cavity.

To avoid contaminating the article cavity 48 the hole 56 for the evacuation tube 52 is machined and cleaned prior to the hub 14 and the vain ring 12 being assembled and weld sealed together.

A sound welding technique must be used to weld the evacuation tube 52 in place in the hole 56 without closing off the passageway 54 at the base of the evacuation tube. In practice, this technique was developed by tack welding the hub 14 to the vane ring casting 12 at several locations on both end portions, welding the evacuation tube 52 in the hole 56, drawing air through the passageway 54 of the evacuation tube to verify that it has remained open, and then applying the final circumferential seal welds 44, 46. As an alternative technique, a quartz rod, about 127 mm (5 inch) long, could be slipped into the evacuation passageway 54 to prevent weld burn-through at the base of the evacuation tube 52.

After the circumferential seal weld 44, 46 have been completed a vacuum is drawn in the article cavity 48 through the passageway 54, by the vacuum leak detector to test the vacuum integrity of the welded assembly cavity 48. Helium gas is then flooded, as by a wand or the like, into each of the fluid passages 26 and along each of the circumferential weld seals 44, 46, and 58. The vacuum in the article cavity 48 will draw in the helium through any microscopic leak in the fluid passage 26, and weld seals 44, 46, 58, out the evacuation passageway 54 and into the vacuum leak detector unit which causes an audible alarm to activate. The exact location of the leak can then be determined by methodically metering helium in the known general area, and when found, can be weld repaired with vacuum continuing to be drawn on the evacuation passageway 54 until the vacuum leak is stopped. Whether the vacuum leak is a micropore or a general porous area, the vacuum in the article cavity 48 will tend to draw in the molten weld filler so as to form an effective seal. Without such a vacuum assist, welding a general porous area would be very difficult.

After all the repairs have been completed and the integrity of the impeller wheel assembly 10 is assured as preparation for sealing the passageway 54 in the evacuation tube 50, it is good practice to pump down the article cavity 48 to below 50 microns for not less than 5 minutes to reasonably minimize gaseous contamination.

Figure 5:
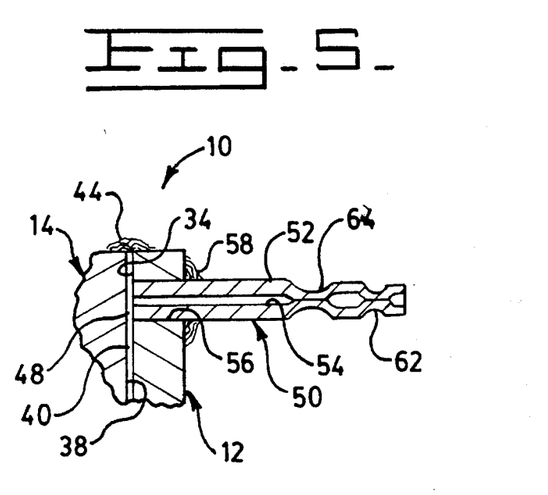
FIG. 5 is an enlarged fragmentary cross-sectional view showing the evacuation tube of FIG. 4 after crimping but prior to HIP bonding the impeller wheel assembly.
Figure 6:
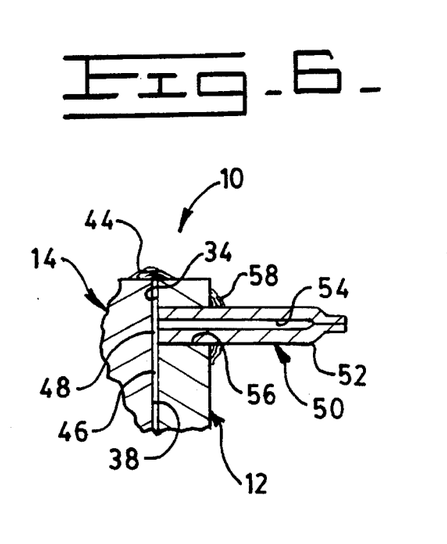
FIG. 6 is an enlarged fragmentary cross-sectional view showing the evacuation tube of FIG. 5, after sealing but prior to HIP bonding the impeller wheel assembly.

While the article cavity 48 is still under vacuum, the evacuation tube 50 is preferably crimped in two places 62, 64 adjacent its outer end, as shown in FIG. 5, sealing the evacuation passageway 54. A weld torch is then used to burn through or separate the innermost crimp 64, causing molten metal to be drawn into the crimp, thereby achieving a permanent seal of the passageway 54 and article cavity 48 under vacuum. FIG. 6 illustrates the evacuation tube 50 after it has been burnt through and the end sealed. The outer crimp 62 is a safety measure to protect the vacuum leak detector from the shock of an inrush of air when the evacuation tube 50 is separated by the weld torch.

The impeller wheel assembly 10 is then subjected to hot isostatic pressing, a process well known in the art. By sealing the gap 40 with the circumferential weld seals 44 and 46 only the exposed outer surfaces of the vane ring 12 and the hub 14 will be subjected to direct application of elevated temperature and autoclave pressure to press together the adjacent peripheral surfaces 34, 38 to form an diffusion bond therebetween.

As best shown in FIGS. 8–13, an alternate embodiment of the method of manufacturing an impeller assembly 10 is illustrated. In FIGS. 8–13 all similar elements are identified with the same element number followed by a prime symbol. The vane ring 12' and the hub 14' of the alternate embodiment are identical to the vane ring 12 and the hub 14 of the preceding embodiment. The cleaning and testing of the vane ring 12' and hub 14' are also identical to the preceding embodiment.

In the alternate embodiment, as best shown in FIGS. 9–13 the evacuation tube 50' is fitted in a hole 100 defined in the vane ring 12' and hub 14' with the evacuation passageway in fluid communication with the article cavity 48'. The evacuation tube 50' extends outward from the end surface 28' of the second wall 20'. The axis of the tube 50' is generally parallel to the axis 22' of the vain ring 12. The evacuation tube 50' is sealed in the hole 100 by a fourth circumferential weld 102.

Figure 10:
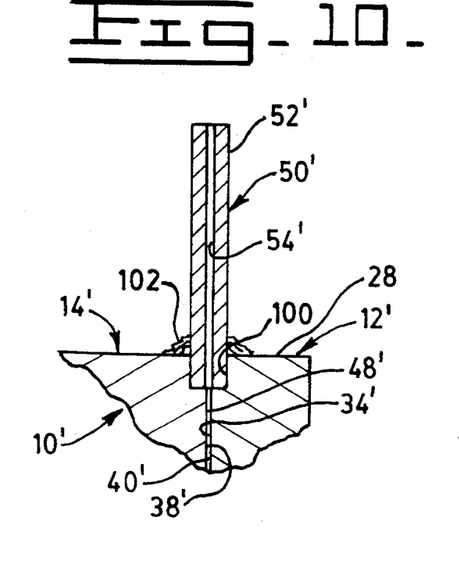
FIG. 10 is an enlarged fragmentary diagrammatic cross-sectional view of the alternate embodiment showing a hole defined in a vane ring and a hub and an evacuation tube welded in the hole communicating with the interface cavity.

No lubricant should be used when drilling or otherwise forming the hole 100 for the evacuation tube 50', so as to avoid contaminating the article cavity 48'. And of course, the wheel assembly 10' may be drilled from the underside so as to minimize chip contamination. In practice, this has not been found necessary.

The same sound welding technique, as used in the preceding arrangement of FIGS. 1–8, must be used to weld the evacuation tube 50' in place in the hole 100 without closing off the passageway 54' at the base of the evacuation tube. In practice, the hub 14' is tack welded to the vane ring 12' casting at several locations on both end portions, welding the evacuation tube 50' in the hole 100. Air is drawn through the passageway 54' of the evacuation tube 50' to verify that the passage 54' has remained open, and then the final circumferential seal welds 44', 46' are applied. As before, a quartz rod, could be slipped into the evacuation passageway 54' to prevent weld burn-through at the base of the evacuation tube 50'.

As in the preceding arrangement of FIGS. 1-8, the same test procedure is implemented where after the circumferential seal weld 44', 46' and 102 have been completed a vacuum is drawn in the article cavity 48' through the passageway 54', by the vacuum leak detector to test the vacuum integrity of the welded assembly cavity 48'. Helium gas is then flooded into each of the fluid passages 26' and along each of the circumferential weld seals 44', 46', and 102. The vacuum in the article cavity 48' will draw in the helium through any microscopic leak in the fluid passage 26', and weld seals 44', 46', 102, out the evacuation passageway 54' and into the vacuum leak detector unit which causes an audible alarm to activate. The exact location of the leak can then be determined and weld repaired with vacuum continuing to be drawn on the evacuation passageway 54' until the vacuum leak is stopped.

Figure 11:
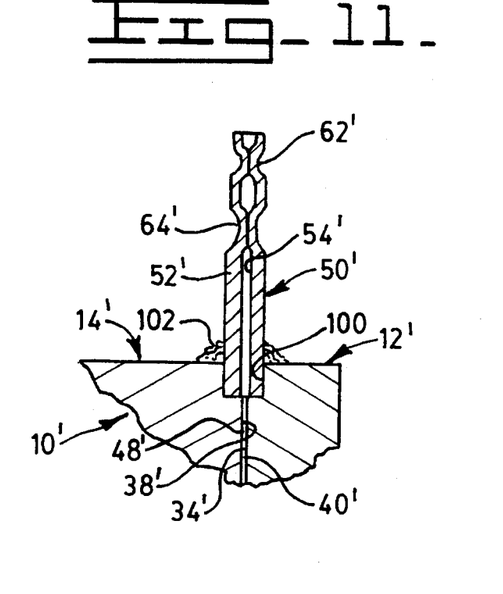
FIG. 11 is an enlarged fragmentary cross-sectional view showing the evacuation tube of FIG. 10 after crimping but prior to HIP bonding the impeller wheel assembly.
Figure 12:
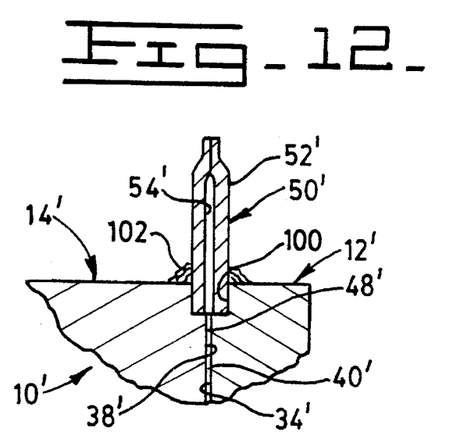
FIG. 12 is an enlarged fragmentary cross-sectional view showing the evacuation tube of FIG. 11, after sealing but prior to HIP bonding the impeller wheel assembly.

While the article cavity 48' is still under vacuum, the evacuation tube 50' is preferably crimped in two places 62', 64' adjacent its outer end, as shown in FIG. 11, sealing the evacuation passageway 54'. A weld torch is then used to burn through the innermost crimp 64', causing molten metal to be drawn into the crimp, thereby achieving a permanent seal of the passageway 54' and article cavity 48' under vacuum as shown in FIG. 12.

The impeller wheel assembly 10' is then subjected to hot isostatic pressing to press together the adjacent peripheral surfaces 34', 38' to form an diffusion bond therebetween.

The hot isostatic cycle used for the embodiments of this invention was 1162° C. at an argon pressure of 1033.5 bar (2125° F. at 15,000 psi) for 4 hours minimum at temperature. It is well recognized that for each alloy to be hot isostatic pressed, there are many combinations of temperature, pressure and time that can achieve a successful HIP bond. Any combination of HIP parameters used for densification would be suitable for diffusion bonding. In practice, during temperature ramp-up in the HIP cycle, the preformed vane ring 12, 12' casting heats up much faster than the hub 14, 14', due to its substantially greater surface area to volume ratio. This causes early-on expansion of the vane ring 12, 12' casting, resulting in extra-ordinary stress and often cracking in the first and second circumferential weld seals 44, 44', and 46, 46' when parent filler metal was used. For this reason, a highly ductile 300 series stainless was used as a weld filler material, which could more readily withstand this stress.

The evacuation tube 50, 50', used was 3.175 mm (.125 inch) O.D. by .89 mm (.035 inch) wall and made from 304 seamless stainless steel. A 103.2 mm (4 inch) long evacuation tube was found suitable, with about half remaining after the evacuation tube is weld sealed at the inner crimp.

It should also be recognized in practice, it may be desirable to use multiple crimps to assure a temporary vacuum tight seal. However, full integrity of this seal is not necessary, since during the weld/cut off operation, molten metal will be drawn into the evacuation passageway 54, 54' to complete the seal.

Figure 7:
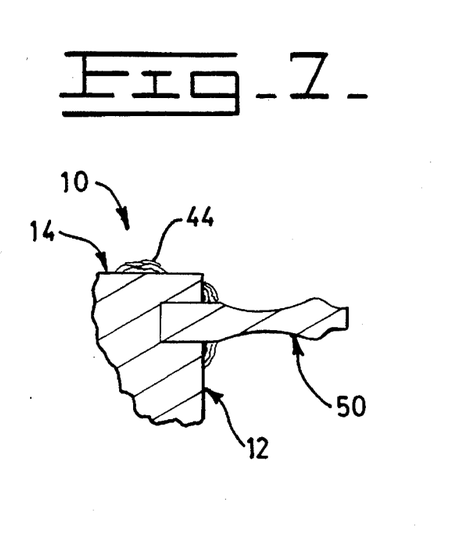
FIG. 7 is an enlarged fragmentary cross-sectional view showing the evacuation tube of FIG. 6 as is appears after successful HIP bonding of the impeller wheel assembly.
Figure 8:
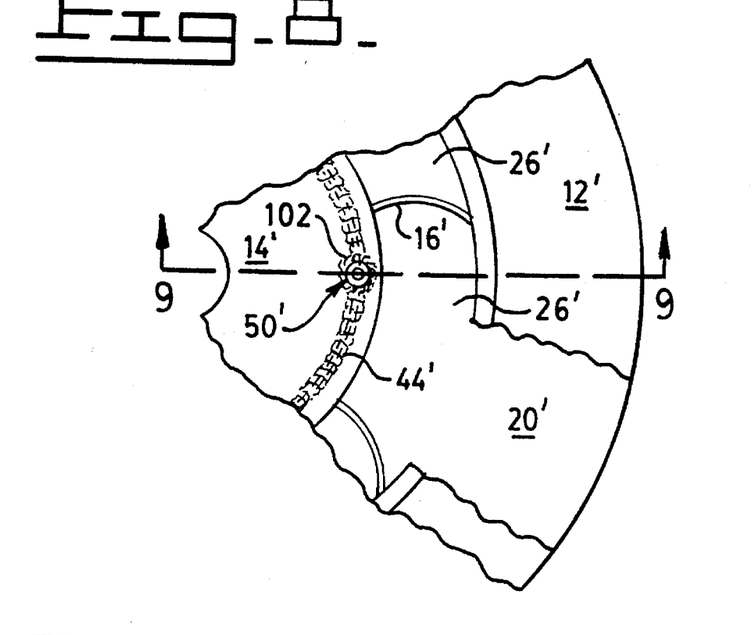
FIG. 8 is a diagrammatic fragmentary top view of an alternate embodiment of the impeller wheel assembly.
Figure 9:
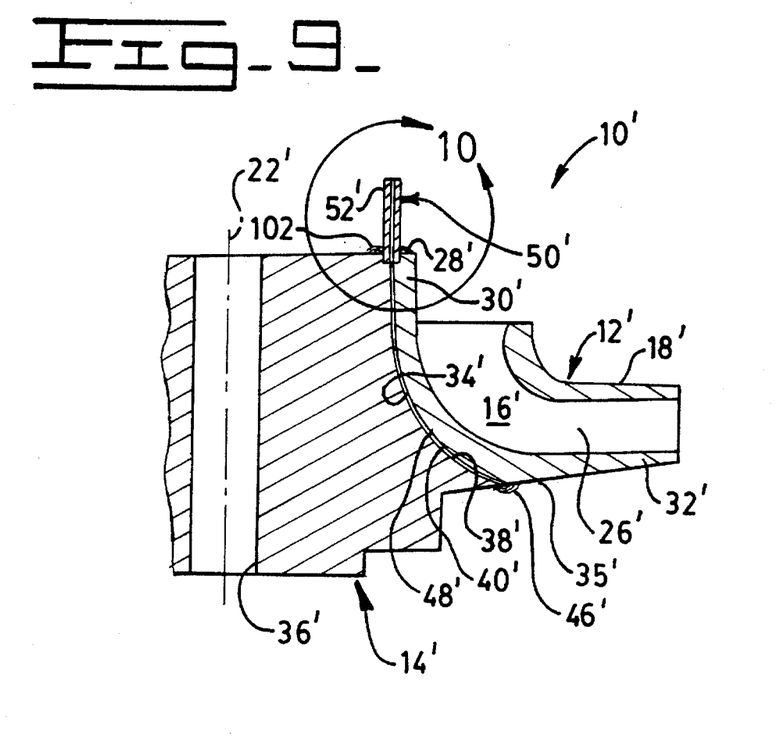
FIG. 9 is a diagrammatic fragmentary cross-sectional of the alternate embodiment of this invention taken along lines 8—8 of FIG. 8.
Figure 13:
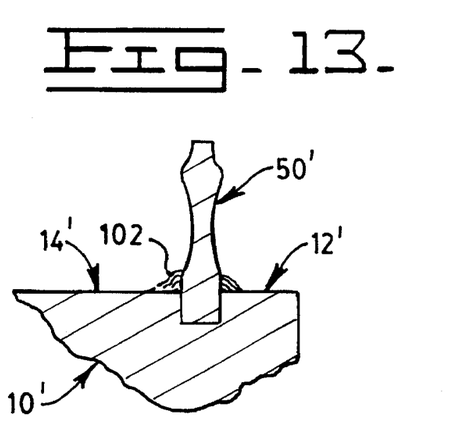
FIG. 13 is an enlarged fragmentary cross-sectional view showing the evacuation tube of FIG. 12 as is appears after successful HIP bonding of the impeller wheel assembly.

Immediately after hot isostatic pressing, the success or failure of the bond cycle may be determined by inspecting the evacuation tube 50, 50'. A successful diffusion bond of the articles 12, 12', 14, and 14' will have occurred if the evacuation tube 50, 50' sidewall 52, 52' has collapsed or flattened, as shown in FIGS. 7 and 13, by the elevated pressure and temperature of the HIP bond cycle. This will have signified that the vacuum integrity of the article cavity 48, 48' was maintained during the HIP bond cycle and the first and second surfaces 34, 34' and 38, 38' were not directly exposed to the pressure of the HIP cycle. An unsuccessful bonding of the articles 12, 12' and 14, 14' can be determined if the evacuation tube 50, 50' side wall 52, 52' has not been collapsed. This will signify that the vacuum integrity was not maintained and the pressure of the HIP bond cycle leaked into the article cavity 48, 48' equalizing the internal and external pressure so as to defeat the bonding process.

The invention can be applied to any size vane ring 10, 10' but has been found particularly advantageous starting at approximately 45.4 kg (100 pounds) of poured weight to yield a vane ring casting of approximately about 22.7 kg (50 pounds) after gates and risers are removed.

The outer peripheral surface 38, 38' of the hub 14, 14' and the inner peripheral surface 34, 34' of the vane ring 12, 12' are preferably machined so as to achieve a gap 40, 40' interface clearance of between approximately 0.05 mm to 0.15 mm (0.002 inch to 0.006 inch) between the surfaces, but in practice the interface surfaces 34, 34' and 38, 38' can be contiguous. Tests have been performed demonstrating a successful diffusion bond with interface clearances up to approximately 0.25 mm in 0.05 mm (0.010 inch in 0.002 inch) increments. However, a press fit or an interference fit would be considered detrimental to verifying the vacuum integrity of article cavity 48, 48'.

After HIP bonding the impeller assembly 10, 10' may then be finish machined to specific predetermined dimensions and heat treated as required. The evacuation tube 50, 50' is located within the added machine stock allowance area of the vane ring 12, 12' that will be completely removed after HIP bonding.

INDUSTRIAL APPLICABILITY

The method of this invention is for determining the generation of a diffusion bond between the first and second mating articles 12, 12' and 14, 14'. The first and second mating articles define the article cavity 48, 48'. The evacuation tube 50, 50' is provided having a sidewall 52, 52' and a passageway 54, 54' therethrough.

The evacuation tube 50, 50' and the periphery of mating articles 12, 12' and 14, 14' are sealed together defining the cavity 48, 48' between the articles 12, 12' and 14, 14' with the evacuation passageway 54, 54' in communication with said article cavity 48, 48'.

A vacuum is drawn in the article cavity 48, 48' and the tube passageway 54, 54' whereupon the passageway 54, 54' is sealed at a location spaced from the sealed articles 12, 12, and 14, 14'. The sealed articles 12, 12' and 14, 14' including the associated evacuation tube 50, 50' are then subjected to a temperature and pressures sufficient to cause diffusion bonding of the interface gap 40, 40'.

The evacuation tube 50, 50' is inspected, and a successful diffusion bonding of the articles 12, 12', and 14, 14' is determined in response to the evacuation tube sidewall 52, 52' being collapsed. An unsuccessful diffusion bonding of the articles 12, 12' and 14, 14' is determined in response to the evacuation tube sidewall 52, 52' not being collapsed.

Accordingly, the subject method provides a viable production process for HIP bonding a hub 14, 14' and a vane ring 12, 12' to form a monolithic impeller wheel assembly 10, 10'. The method pre-tests the vacuum integrity of the sealed interface cavity 48, 48' between the vane ring 12, 12' and hub 14, 14', using a helium leak testing technique. The technique not only can determine if a leak exists, but can also determine the exact location of the leak, so that the leak can be sealed as by welding, prior to HIP bonding, and thereby provide a relatively high assurance of a successful diffusion bonding.

In the preferred embodiment, illustrated in FIGS. 1–8, the evacuation tube 50 is fitted in a hole 56 defined in the inner end portion 30 of the vane ring 12 adjacent the end surface 28 prior to assembly with a hub 14, 14'. Preferably the hole 56 is generally perpendicular to the central axis 22 which locates the evacuation tube completely below the end surface 30. Since the evacuation tube 50 is below the end surface 30 the overall height of the assembly is reduces and allows increased loading capacity in the HIP furnace. Also, this allows the impeller wheel assembly 10 to be inverted in the HIP furnace fixture, allowing in some cases, two parts per furnace shelf.

By so constructing the impeller assembly 10, 10' of this invention, the problems as set forth above are overcome.

Other aspects, objectives, and advantages of this invention can be obtained from a study of the drawings, the disclosure and the appended claims.

We claim:

1. A method for diffusion bonding first and second mating articles defining a cavity therebetween, comprising:

tack welding the first article to the second article at several locations;

providing an evacuation tube having a sidewall and a passageway therethrough, sealing the evacuation tube in a hole defined in the articles and sealing the evacuation tube and the periphery of said mating articles together and defining a cavity between the articles with said evacuation passageway in communication with said article cavity;

drawing air through the passageway of the evacuation tube to verify that the passageway remained open after sealing the evacuation tube and prior to sealing the periphery of the mating articles;

drawing a vacuum in the article cavity and the tube passageway;

testing the vacuum integrity of the cavity;

sealing the passageway at a location spaced from the sealed articles;

subjecting the sealed articles having the associated evacuation tube to a temperature and pressures sufficient to diffusion bond the articles together;

inspecting the associated evacuation tube and determining successful diffusion bonding of the articles in response to the evacuation tube sidewall being collapsed, providing visual confirmation that the seal was maintained during hot isostatic pressing and determining the unsuccessful diffusion bonding of the articles in response to the evacuation tube sidewalls not being collapsed.

2. A method as set forth in claim 1, where the first and second mating articles are metal, including:

providing the first article with an inner peripheral surface; and providing the second article with an outer peripheral surface, the inner peripheral surface and the outer peripheral surface are of substantially mating shape and adjacent with one another with an annular gap defined between the adjacent mating surfaces greater than 0.00 mm (0.00 inch) but less than 0.25 mm (0.010 inch).

3. A method as set forth in claim 2, including:

providing an annular gap preferably within the range of between approximately 0.05 mm to 0.15 mm (0.002 inch to 0.006 inch).

4. A method as set forth in claim 2, including:

cleaning the inner peripheral surface and the outer peripheral surface prior to sealing the periphery of the mating surfaces together by repeatedly wiping the mating surfaces with a lint-free cloth soaked with a residue-free solvent.

5. A method as set forth in claim 1, including:

drawing a vacuum in the cavity through the passageway of the evacuation tube to verify the vacuum integrity of the cavity; and flooding the first and second articles with helium gas such that the vacuum in the cavity will draw in the helium gas through any microscopic leaks;

locating any leaks; and weld repairing the leak, while continuing to be drawn a vacuum on the cavity until the vacuum leak is stopped.

6. A method as set forth in claim 1, including:

providing an evacuation tube with a diameter of 3.175 mm (0.125 inch) having a wall thickness of 0.89 mm (0.035 inch) and made of 304 stainless steel.

7. A method of determining the generation of a diffusion bond between adjacent mating surfaces of an impeller wheel assembly including a vane ring and a hub, comprising the steps of:

pre-forming the vane ring from ferrous material the vane ring having a ring wall and a central axis, said ring wall having an end portion a first surface, and end surface;

placing the hub within the vane ring such that the first Surface of the vane ring is adjacent the second surface of the hub and defining co-terminus peripheries therebetween;

tack welding the vane ring to the hub at several locations;

welding about the peripheries to join the vane ring and the hub and defining a sealed cavity therebetween;

connecting an evacuation tube having a side wall and a passageway therethrough to the cavity and sealing the evacuation tube in a hole defined in the vain ring and hub;

drawing air through the passageway of the evacuation tube to verify that the passageway remained open after sealing the evacuation tube and prior to sealing the periphery of the adjacent mating surfaces;

drawing a vacuum in the cavity through the passageway of the evacuation tube;

testing the vacuum integrity of the cavity;

sealing the passageway of the evacuation tube while under vacuum to seal the cavity under vacuum;

subjecting the vane ring, the hub and the evacuation tube to a temperature and pressure sufficient to cause diffusion bonding of the adjacent first and second surfaces;

inspecting the evacuation tube; and determining successful diffusion bonding of the mating surfaces in response to the evacuation tube sidewall being collapsed and determining the unsuccessful diffusion bonding of the mating surfaces in response to the evacuation tube sidewalls not being collapsed.

8. A method as set forth in claim 7, including:

providing an annular gap between the adjacent mating surfaces greater than 0.00 mm (0.00 inch) but less than 0.25 mm (0.010 inch).

9. A method as set forth in claim 8, including:

providing an annular gap preferably within the range of between approximately 0.05 mm to 0.15 mm (0.002 inch to 0.006 inch).

10. A method as set forth in claim 7, wherein the step of testing the vacuum integrity of the cavity includes:

flooding the vane ring and hub with helium gas so that the vacuum in the cavity will draw in the helium gas through any microscopic leaks in the vane ring and hub.

11. A method as set forth in claim 10, including:

weld repairing the leaks while vacuum is being drawn on the cavity until the vacuum leak is stopped.

12. A method as set forth in claim 11, including:

providing an evacuation tube with a diameter of 3.175 mm (0.125 inch) having a wall thickness of 0.89 mm (0.035 inch) and made of 304 stainless steel.

13. A method as set forth in claim 7, including:

providing a hole in said end portion adjacent said end surface, said axis of said hole being perpendicular to said central axis; and axially sealing said evacuation tube in said hole.

* * * * *

UNITED STATES PATENT AND TRADEMARK OFFICE
CERTIFICATE OF CORRECTION

PATENT NO. : 5,593,085

DATED : January 14, 1997

INVENTOR(S) : HENRY J. TOHILL, ET AL.

It is certified that error appears in the above-identified patent and that said Letters Patent is hereby corrected as shown below:

Column 9, line 48, a semi-colon needs to be placed between "tube" and "and".

Column 10, line 32, "Surface" should be changed to "surface".

Column 10, line 33, ther-ebetween needs to be hyphenated there-between.

Signed and Sealed this

Fourteenth Day of July, 1998

Attest:

BRUCE LEHMAN

*Attesting Officer*  *Commissioner of Patents and Trademarks*